(12) United States Patent  (10) Patent No.: US 6,870,778 B2
Ozawa et al.  (45) Date of Patent: Mar. 22, 2005

(54) SEMICONDUCTOR DEVICE INCLUDING A VOLTAGE MONITORING CIRCUIT

(75) Inventors: Yukihiro Ozawa, Kawasaki (JP); Akira Miho, Kawasaki (JP)

(73) Assignee: Fujitsu Limited, kawasaki (JP)

( * ) Notice: Subject to any disclaimer, the term of this patent is extended or adjusted under 35 U.S.C. 154(b) by 37 days.

(21) Appl. No.: 10/373,739

(22) Filed: Feb. 27, 2003

(65) Prior Publication Data
US 2003/0178643 A1 Sep. 25, 2003

(30) Foreign Application Priority Data

Mar. 20, 2002 (JP) ........................................ 2002-079714

(51) Int. Cl.[7] .............................................. G11C 7/00
(52) U.S. Cl. .............................. 365/189.09; 365/189.07
(58) Field of Search ........................ 365/189.07, 189.09, 365/226; 323/266, 268

(56) References Cited

U.S. PATENT DOCUMENTS

| | | | |
|---|---|---|---|
| 5,046,052 A | 9/1991 | Miyaji et al. | ................ 365/226 |
| 6,388,432 B2 * | 5/2002 | Uchida | ........................ 323/266 |
| 6,608,997 B1 * | 8/2003 | Fischer et al. | ............ 455/127.1 |

FOREIGN PATENT DOCUMENTS

| | | |
|---|---|---|
| JP | 2-40195 | 2/1990 |
| JP | 2001-16770 | 1/2001 |

* cited by examiner

Primary Examiner—Vu A. Le
(74) Attorney, Agent, or Firm—Staas & Halsey LLP

(57) ABSTRACT

An semiconductor device includes a voltage-decreasing regulator which converts a source voltage into an output voltage in accordance with a control signal, the regulator supplying the output voltage to an internal module via a power line. An analog-to-digital converter converts the output voltage received from the power line, into an output signal indicating a value of the output voltage. A voltage monitoring circuit has a control register holding a value predetermined for a selected operational mode. The voltage monitoring circuit generates the control signal based on a result of comparison between the value indicated by the output signal of the converter and the value held by the control register, and outputs the control signal to the regulator so that the regulator supplies the output voltage, adjusted to an optimal output voltage for the selected operational mode by the control signal, to the internal module.

11 Claims, 6 Drawing Sheets

SEMICONDUCTOR DEVICE INCLUDING A VOLTAGE MONITORING CIRCUIT

CROSS-REFERENCE TO RELATED APPLICATIONS

This application is based upon and claims the benefit of priority from the prior Japanese Patent Application No. 2002-079714, filed on Mar. 20, 2002, the entire contents of which are hereby incorporated by reference.

BACKGROUND OF THE INVENTION

1. Field of the Invention

The present invention relates to a semiconductor device in which a voltage monitoring circuit monitors a voltage output from a voltage-decreasing regulator provided in a semiconductor integrated circuit.

2. Description of the Related Art

Conventionally, a voltage-decreasing regulator, which is provided in a semiconductor integrated circuit, supplies a power-source voltage to a plurality of internal modules in the semiconductor integrated circuit. In such semiconductor integrated circuit, there are some operational modes, such as a normal operational mode, a low-power mode, etc. Regardless of which operational mode of the semiconductor integrated circuit is selected, the conventional regulator supplies the same power-source voltage to the internal modules.

Moreover, in the semiconductor integrated circuit, the power-source wiring is provided for supplying the source voltage output from the regulator to the internal modules. However, it is not assured that the source voltage supplied through the power-source wiring in the semiconductor integrated circuit is kept at the same level. Rather, the source voltage supplied is varied depending on the wire length between the conventional regulator and the subject internal module along the power-source wiring. A relatively large drop of the source voltage supplied may occur when the wire length from the regulator is long, or when the location where the source voltage is supplied is located adjacent to the internal module which consumes a large amount of the supplied current.

Japanese Laid-Open Patent Application No. 2001-16770 discloses a power supply device which includes a voltage-increasing circuit, a detection unit, and an output-voltage control unit. In the power supply device, the voltage-increasing circuit converts the source voltage of a power supply to an output voltage and supplies the output voltage to the internal modules. The output voltage supplied by the voltage-increasing circuit includes a first step-up voltage and a second step-up voltage higher than the first step-up voltage. The detection unit detects the source voltage of the power supply. The output-voltage control unit controls the voltage-increasing circuit when the source voltage detected by the detection unit is within a predetermined range from the first step-up voltage. At this time, the voltage-increasing circuit supplies the second step-up voltage to the internal modules in accordance with the control by the output-voltage control unit.

However, the conventional power supply device of the above document No. 2001-16770 is directed to reducing the influence of a switching noise of a comparator circuit and performing accurate measurement of the source voltage supplied. The conventional power supply device serves to perform the switching operation to select one of the first step-up voltage and the second step-up voltage being supplied to the internal modules. Similar to the conventional regulator, the power supply device of the above document No. 2001-16770 supplies the same power-source voltage to the internal modules, regardless of which operational mode of the semiconductor integrated circuit is selected.

As described above, in the conventional power supply device, the output voltage supplied is fixed regardless of which operational mode of the semiconductor integrated circuit (the normal operational mode, the low-power mode, etc.) is selected. When the semiconductor integrated circuit is operating in the low-power mode, it is desired to reduce the supplied output voltage as low as possible. However, the conventional power supply device is provided to supply the fixed output voltage irrespective of the operational mode, and there is a problem in that the semiconductor integrated circuit may have excessive power consumption during the low-power mode operation.

Moreover, the degree of the voltage drop is varied with the locations within a semiconductor chip to which the source voltage is supplied. That is, the voltage drop in the power supply wiring in which a large amount of current flows is large, and, conversely, the voltage drop in the power supply wiring in which only a small amount of current flows is small.

If the voltage drop is large, the range of the operating voltage of the internal module connected to the power supply wiring will become narrow. In order to secure an adequate range of the operating voltage, it is necessary to provide the internal module with a circuit having a large drive capacity. There is a problem in that the power dissipation and the circuit scale will become large.

SUMMARY OF THE INVENTION

An object of the present invention is to provide a semiconductor device including an improved voltage monitoring circuit in which the above-described problems are eliminated.

Another object of the present invention is to provide a semiconductor device including a voltage monitoring circuit which can reduce the power dissipation by changing the voltage, output by a voltage-decreasing regulator, to an output voltage according to the operational mode of a semiconductor integrated circuit.

Another object of the present invention is to provide a semiconductor device including a voltage monitoring circuit which can supply an optimal supply voltage to a location wherein the voltage drop is large by detecting the voltage output by a voltage-decreasing regulator from a different location along the power supply wiring, and controlling the output voltage of the regulator in accordance with the detected voltage.

The above-mentioned objects of the present invention are achieved by a semiconductor device in which an operational mode is selected from among a number of operational modes, the semiconductor device comprising: a voltage-decreasing regulator changing a source voltage into an output voltage in accordance with a control signal, the regulator supplying the output voltage to an internal module of the semiconductor device via a power line; an analog-to-digital converter converting the output voltage, received from the power line, into an output signal which indicates a value of the received output voltage; and a voltage monitoring circuit having a control register that holds a value predetermined for the selected operational mode, and generating a control signal based on a result of comparison between the value indicated by the output signal of the converter and the value held by the control register, wherein the voltage monitoring circuit outputs the control signal to the regulator so that the regulator supplies the output voltage, which is adjusted to an optimal output voltage for the selected operational mode by the control signal, to the internal module.

According to the voltage monitoring circuit of the present invention, an optimal output voltage for a selected one of a number of operational modes can be supplied to the internal module, and it is possible that the semiconductor device including the voltage monitoring circuit of the present invention achieve reduction of the power dissipation.

Moreover, in the voltage monitoring circuit of the present invention, the output voltage of the voltage-decreasing regulator is controllable according to the source voltage taken out from a different location along the power supply wiring, and it is possible to set the output voltage of the regulator to an optimal output voltage for a location where the voltage drop is large. Therefore, it is possible to prevent the narrowing of the range of the operating voltage of the internal module connected to the power supply wiring in which the voltage drop is large, as in the conventional power supply device.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1:
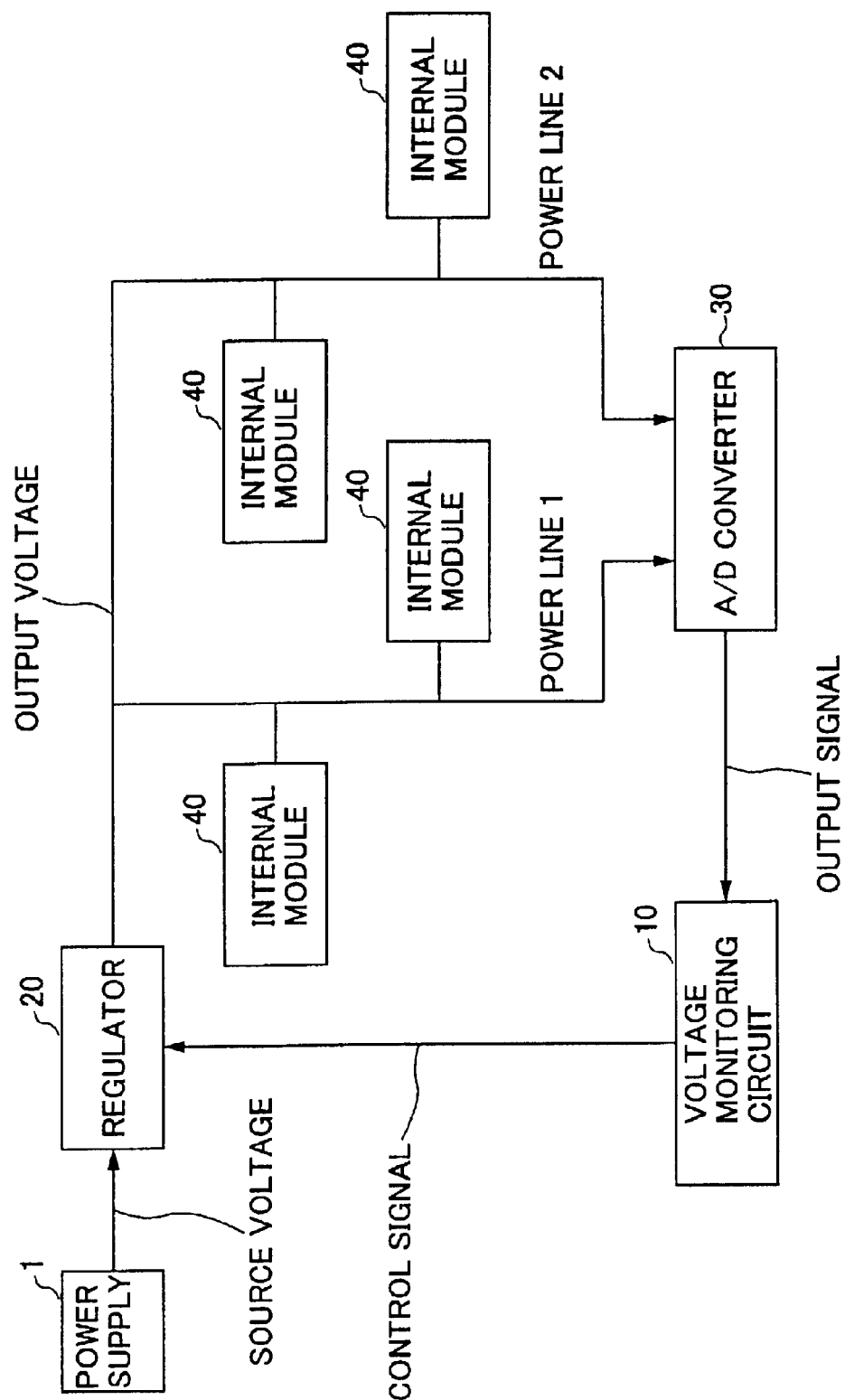
FIG. 1 is a block diagram of the semiconductor device in one preferred embodiment of the present invention.

FIG. 1 shows the semiconductor device in one preferred embodiment of the present invention.

As shown in FIG. 1, the semiconductor device of this embodiment generally includes a power supply 1, a voltage monitoring circuit 10, a voltage-decreasing regulator 20, an A/D (analog-to-digital) converter 30, and a plurality of internal modules 40.

In the semiconductor device of FIG. 1, one operational mode is selected from among a number of operational modes at a suitable time by a control unit (not shown). Then, the semiconductor device is controlled to operate in accordance with the selected operational mode.

In the semiconductor device of FIG. 1, the voltage monitoring circuit 10 is provided with a control register, and a predetermined value, which is different for each of the number of operational modes, is written to the control register.

For example, when the normal operational mode is selected the hexadecimal value FFh is written to the control register 12, when the sleep mode is selected the hexadecimal value AAh is written to the control register 12, and when the stop mode is selected the hexadecimal value 55 h is written to the control register 12, respectively.

It should be noted that the values, which are predetermined for the normal operation mode, the sleep mode and the stop mode, are arranged in descending numeric order. An optimal output voltage of the regulator 20 for the normal operation mode is the highest among those for the three operational modes, and an optimal output voltage of the regulator 20 for the stop mode is the lowest among those for the three operational modes.

Accordingly, in the semiconductor device of the present embodiment, whenever one operational mode is selected from among the number of operational modes, a value that is predetermined for the selected operational mode is held by the control register of the voltage monitoring circuit 10. The value held by the control register is used to monitor the source voltage supplied to the internal modules via the power lines.

In the semiconductor device of FIG. 1, the voltage-decreasing regulator 20 converts the source voltage from the power supply 1 into an output voltage in accordance with a control signal which is supplied from the voltage monitoring circuit 10. The regulator 20 supplies the output voltage to each of the internal modules 40 of the semiconductor device via the power line (or the power supply wiring).

In the embodiment of FIG. 1, the power line, which is linked to the output of the voltage-decreasing regulator 20, is branched into the power line-1 and the power line-2, and such branch power lines are connected to the plurality of internal modules 40. Hence, the output voltage of the regulator 20 is supplied to each internal module 20 through one of the branch power lines.

Furthermore, in the semiconductor device of FIG. 1, the ends of the branched power lines (the power line-1, the power line-2, etc.) are connected to the inputs of the A/D converter 30, respectively. The A/D converter 30 converts the output voltage (analog signal), received from each power line, into a digital signal that indicates a value of the received output voltage. The output signal of the A/D converter 30 is supplied to the voltage monitoring circuit 10.

The voltage monitoring circuit 10 generates a control signal based on a result of comparison between the value indicated by the output signal of the A/D converter 30 and the value held by the control register. The control signal from the voltage monitoring circuit 10 is supplied to the regulator 20. Thus, the voltage monitoring circuit 10 adjusts the output voltage of the regulator 20 to an optimal output voltage for the selected operational mode by supplying the control signal to the regulator 20.

Specifically, in the semiconductor device of the present embodiment, when the value indicated by the output signal of the A/D converter 30 is larger than the value held by the control register of the voltage monitoring circuit 10, the voltage monitoring circuit 10 outputs a control signal that decreases the output voltage of the regulator 20, to the regulator 20. Hence, in this case, the output voltage of the regulator 20, which is supplied to the internal modules 40, will be decreased in accordance with the control signal from the voltage monitoring circuit 10.

On the other hand, when the value indicated by the output signal of the A/D converter 30 is smaller than the value held by the control register, the voltage monitoring circuit 10 outputs a control signal that increases the output voltage of the regulator 20, to the regulator 20. Hence, in this case, the output voltage of the regulator 20, which is supplied to the internal modules 40, will be increased in accordance with the control signal from the voltage monitoring circuit 10.

Figure 2:
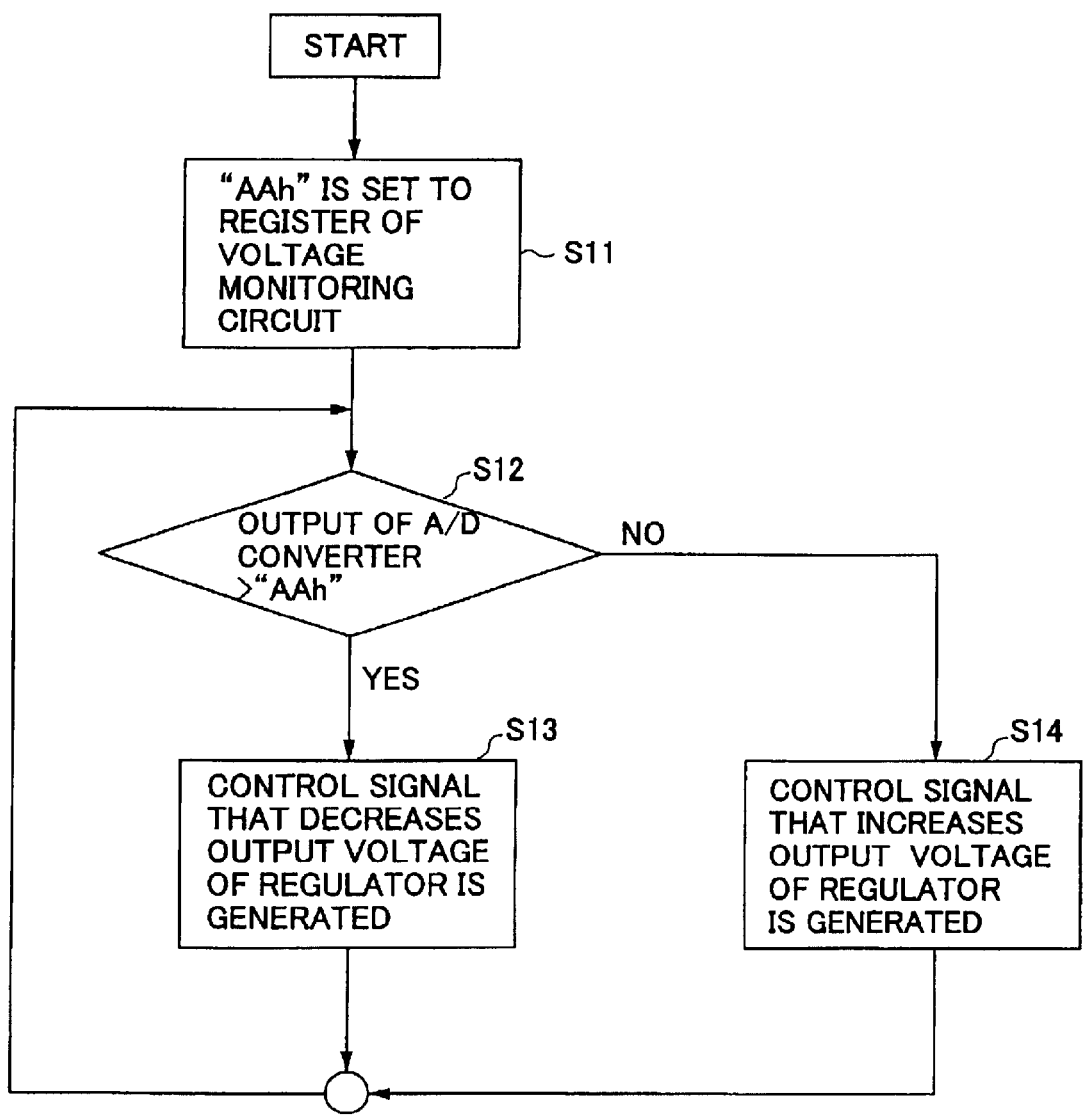
FIG. 2 is a flowchart for explaining operation of a voltage monitoring circuit in the semiconductor device of FIG. 1.

FIG. 2 is a flowchart for explaining operation of the voltage monitoring circuit 10 shown in FIG. 1.

The voltage monitoring procedure by the voltage monitoring circuit 10 is started whenever one operational mode is selected from among the number of operational modes in the semiconductor device.

For the sake of convenience, it is assumed that the sleep mode of the semiconductor device is currently selected.

As shown in FIG. 2, at a start of the voltage monitoring procedure, the voltage monitoring circuit 10 at step S11 sets a predetermined value ("AAh"), which corresponds to the selected operational mode (in this case, the sleep mode), to the control register of the voltage monitoring circuit 10.

The voltage monitoring circuit 10 at step S12 determines whether the value indicated by the output signal of the A/D converter 30 is larger than the value ("AAh") held by the control register at the step S11.

When it is determined in the step S12 that the value of the output signal of the A/D converter 30 is larger than the value held by the control register, the voltage monitoring circuit 10 at step S13 outputs a control signal that decreases the output voltage of the regulator 20, to the regulator 20. In this case, the output voltage of the regulator 20, which is supplied to the internal modules 40, will be decreased.

If a predetermined time has elapsed after the step S13, the control of the voltage monitoring circuit 10 is returned to the above step S12, and the same procedure will be repeated again.

On the other hand, when it is determined in the step S12 that the value of the output signal of the A/D converter 30 is not larger than the value held by the control register, the voltage monitoring circuit 10 at step S14 outputs a control signal that increases the output voltage of the regulator 20, to the regulator 20. In this case, the output voltage of the regulator 20, which is supplied to the internal modules 40, will be increased.

If a predetermined time has elapsed after the step S14, the control of the voltage monitoring circuit 10 is returned to the above step S12, and the same procedure will be repeated again.

As described above, in the semiconductor device of the present embodiment, the output voltage of the voltage-decreasing regulator 20 can be adjusted to an optimal output voltage for the selected operational mode in the semiconductor device. Therefore, for example, when the semiconductor device is operating in the low-power mode, the voltage monitoring circuit 10 of the present embodiment makes it possible to achieve reduction of the power dissipation, unlike the conventional power supply device.

Figure 3:
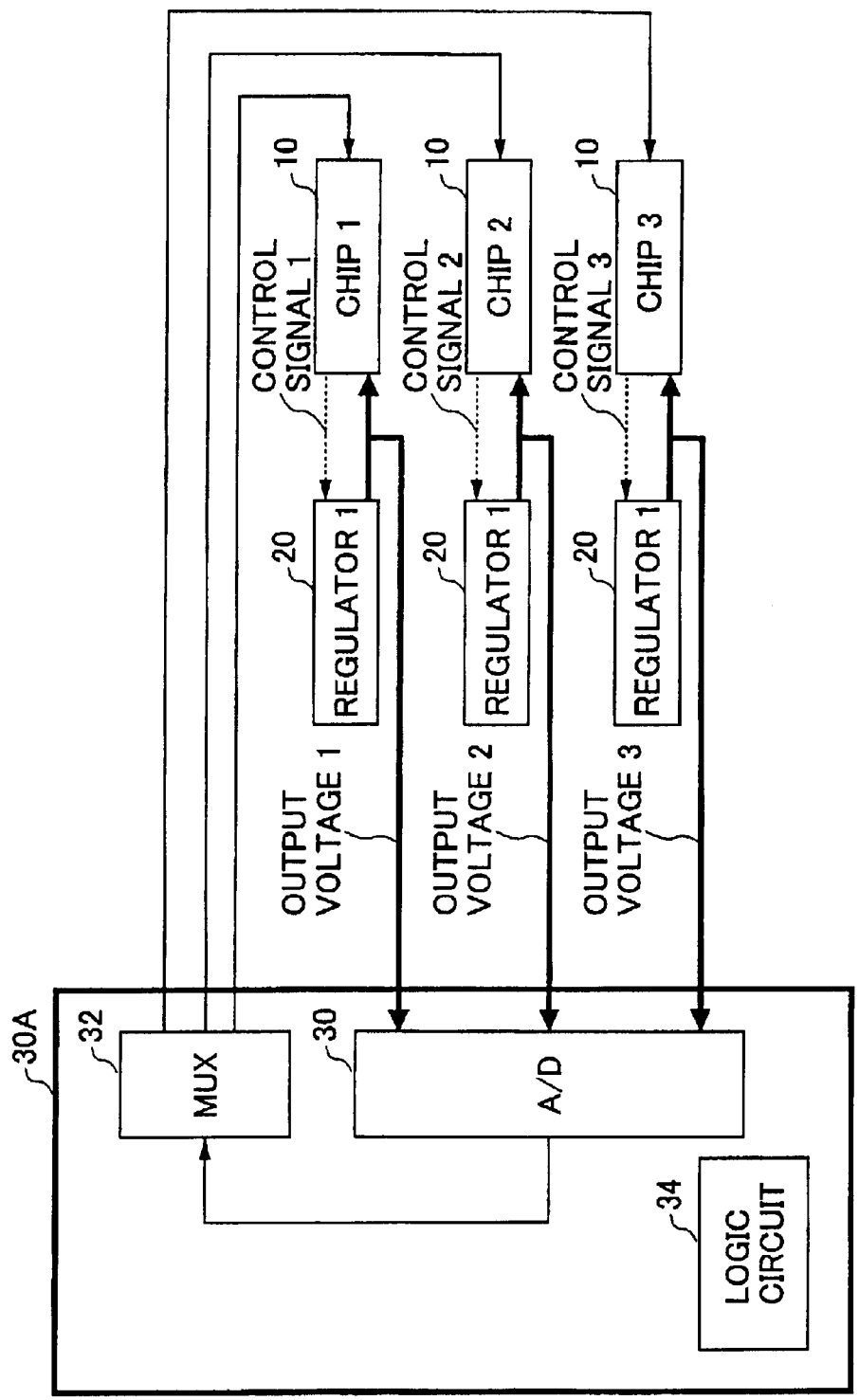
FIG. 3 is a block diagram of the semiconductor device including a plurality of voltage-decreasing regulators in another preferred embodiment of the present invention.

FIG. 3 shows the semiconductor device in another preferred embodiment of the invention, which includes a plurality of voltage-decreasing regulators.

As shown in FIG. 3, the semiconductor device of the present embodiment includes a plurality of voltage monitoring circuits 10, a plurality of voltage-decreasing regulators 20, and a plurality of internal modules respectively connected to the regulators 20 via a plurality of power lines.

In the present embodiment, the plurality of voltage-decreasing regulators 20 include the regulator-1, the regulator-2, the regulator-3, etc. The plurality of voltage monitoring circuits 10 are separately formed on a plurality of semiconductor chips which includes the chip-1, the chip-2, the chip-3, etc.

Furthermore, the A/D converter 30 in the present embodiment is formed on a common semiconductor chip 30A which is provided in common to the plurality of semiconductor chips on which the respective voltage monitoring circuits 10 are provided. On each of the plurality of semiconductor chips 10, one of the internal modules (not shown) of the semiconductor device is formed.

Moreover, in the semiconductor device of the present embodiment, a multiplexer (MUX) 32, which receives the output signals of the A/D converter 30 and supply them to the semiconductor chips 10 respectively, and a logic circuit 34 are also formed on the common semiconductor chip 30A together with the A/D converter 30.

In the semiconductor device shown in FIG. 3, the plurality of voltage-decreasing regulators 20 are arranged at different locations along the power lines. Each regulator 20 converts the source voltage into an output voltage according to a control signal supplied from the corresponding one of the semiconductor chips (or the corresponding voltage monitoring circuit 10 provided therein). Then, the regulator 20 supplies the output voltage to the internal module of the corresponding semiconductor chip 10 via the power line. The functions of the voltage monitoring circuit 10 are essentially the same as those of the voltage monitoring circuit 10 in the previous embodiment of FIG. 1.

The A/D converter 30 of the semiconductor chip 30A converts the source voltage from the corresponding power line into an output signal which indicates the value of the source voltage received from the power line. The A/D converter 30 supplies the output signal to the voltage monitoring circuit 10 of the corresponding semiconductor chip through the multiplexer 32.

The voltage monitoring circuit 10 of each semiconductor chip includes the control register that holds the value predetermined for the selected operational mode. The voltage monitoring circuit 10 generates a control signal based on a result of comparison between the value indicated by the output signal of the A/D converter 30 and the value held by the control register. The voltage monitoring circuit 10 of each semiconductor chip outputs the control signal to the corresponding regulator 20 so that the regulator 20 supplies the output voltage, which is adjusted to an optimal output voltage for the selected operational mode, to the internal module of the semiconductor chip.

Alternatively, the semiconductor device of the present embodiment may be configured to include a plurality of circuit blocks formed on a single semiconductor chip, each circuit block including the voltage monitoring circuit 10, the voltage-decreasing regulator 20 and the plurality of internal modules. The regulators 20 of the circuit blocks are arranged at different locations along the power lines. The regulators 20 and the A/D converter 30 may be formed on the semiconductor chip on which the plurality of circuit blocks are formed.

Alternatively, the semiconductor device of the present embodiment of FIG. 3 may be configured to include a plurality of semiconductor chips each having the voltage monitoring circuit 10, the voltage-decreasing regulator 20 and the A/D converter 30 formed together on the same chip.

As described above, in the semiconductor device of the present embodiment, the output voltage of the voltage-decreasing regulator is controllable according to the source voltage taken out from a different location along the power supply wiring, and it is possible to set the output voltage of the regulator to an optimal output voltage for a location where the voltage drop is large.

Therefore, it is possible for the semiconductor device of the present embodiment to prevent the narrowing of the range of the operating voltage of the internal module connected to the power supply wiring in which the voltage drop is large.

Figure 4:
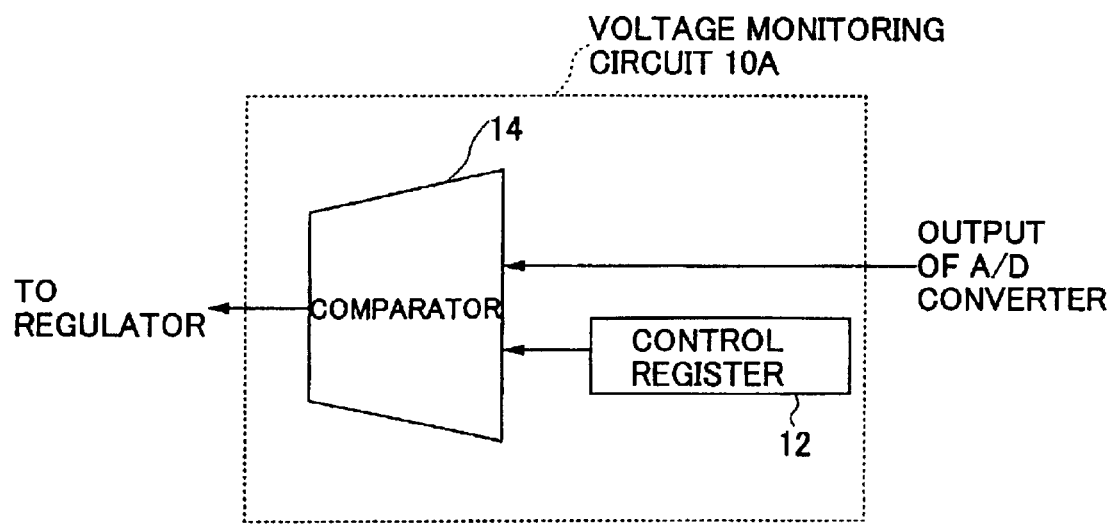
FIG. 4 is a block diagram of the voltage monitoring circuit in one preferred embodiment of the present invention.

FIG. 4 shows the voltage monitoring circuit in one preferred embodiment of the present invention.

As shown in FIG. 4, the voltage monitoring circuit 10A of the present embodiment is provided with a control register 12 and a comparator 14.

Similar to the previous embodiment of FIG. 1, in the voltage monitoring circuit 10A of the present embodiment, a predetermined value which is different for each of the number of operational modes of the semiconductor device is written to the control register 12.

For example, when the normal operational mode is selected the hexadecimal value FFh is written to the control register 12, when the sleep mode is selected the hexadecimal value AAh is written to the control register 12, and when the stop mode is selected the hexadecimal value 55 h is written to the control register 12, respectively.

In the voltage monitoring-circuit 10A of FIG. 4, the value which is held by the control register 12 and corresponds to the selected operational mode is supplied to one input of the comparator 14. On the other hand, the value which is indicated by the output signal of the A/D converter 30 (as shown in FIG. 1) is supplied to the other input of the comparator 14.

The comparator 14 outputs a signal based on a result of comparison between the value held by the control register 12 and the value indicated by the output signal of the A/D converter 30. This output signal of the comparator 14 is supplied to the voltage-decreasing regulator 20 as a control signal.

That is, when the value indicated by the output signal of the A/D converter 30 is larger than the value held by the control register 12, the output signal of the comparator 14 is set in OFF state, and the OFF-state signal from the comparator 14 is supplied to the regulator 20 so that the output voltage of the regulator 20 becomes small according to such control signal.

On the other hand, the value indicated by the output signal of the A/D converter 30 is not larger than the value held by the control register 12, the output signal of the comparator 14 is set in ON state, and the ON-state signal from the comparator 14 is supplied to the regulator 20 so that the output voltage of the regulator 20 becomes large according to such control signal.

Figure 5:
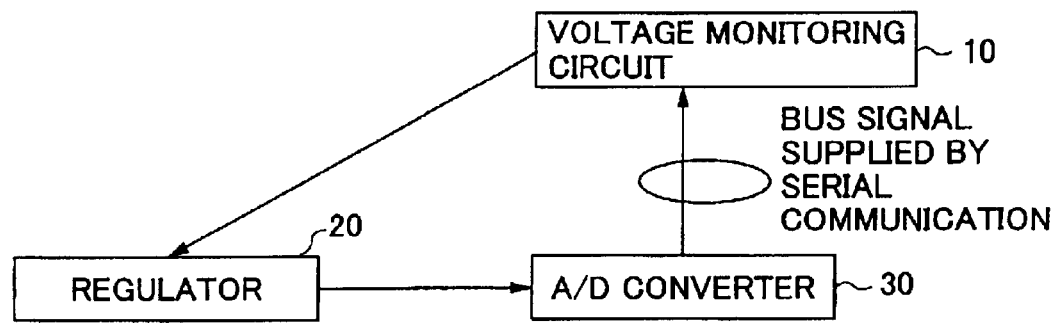
FIG. 5 is a block diagram of the semiconductor device in another preferred embodiment of the present invention.

FIG. 5 shows the semiconductor device in another preferred embodiments of the present invention.

As shown in the FIG. 5, in the semiconductor device of the present embodiment, the connection (bus wiring) between the A/D converter 30 and the voltage monitoring circuit 10 is made by using a serial communication. Hence, in the present embodiment, the output signal of the A/D converter 30 is transmitted to the voltage monitoring circuit 10 by using the serial communication. Other elements in the embodiment of FIG. 5 are essentially the same as the corresponding elements in the semiconductor device of the previous embodiment of FIG. 1.

In the present embodiment, by using the serial communication, the number of signal lines between the A/D converter 30 and the voltage monitoring circuit 10, which are provided to deliver the output signal of the A/D converter 30, can be reduced. Therefore, the semiconductor device of the present embodiment can be produced with low cost and small circuit scale when a plurality of output signals are supplied from the A/D converter 30 to the voltage monitoring circuit 10.

Figure 6:
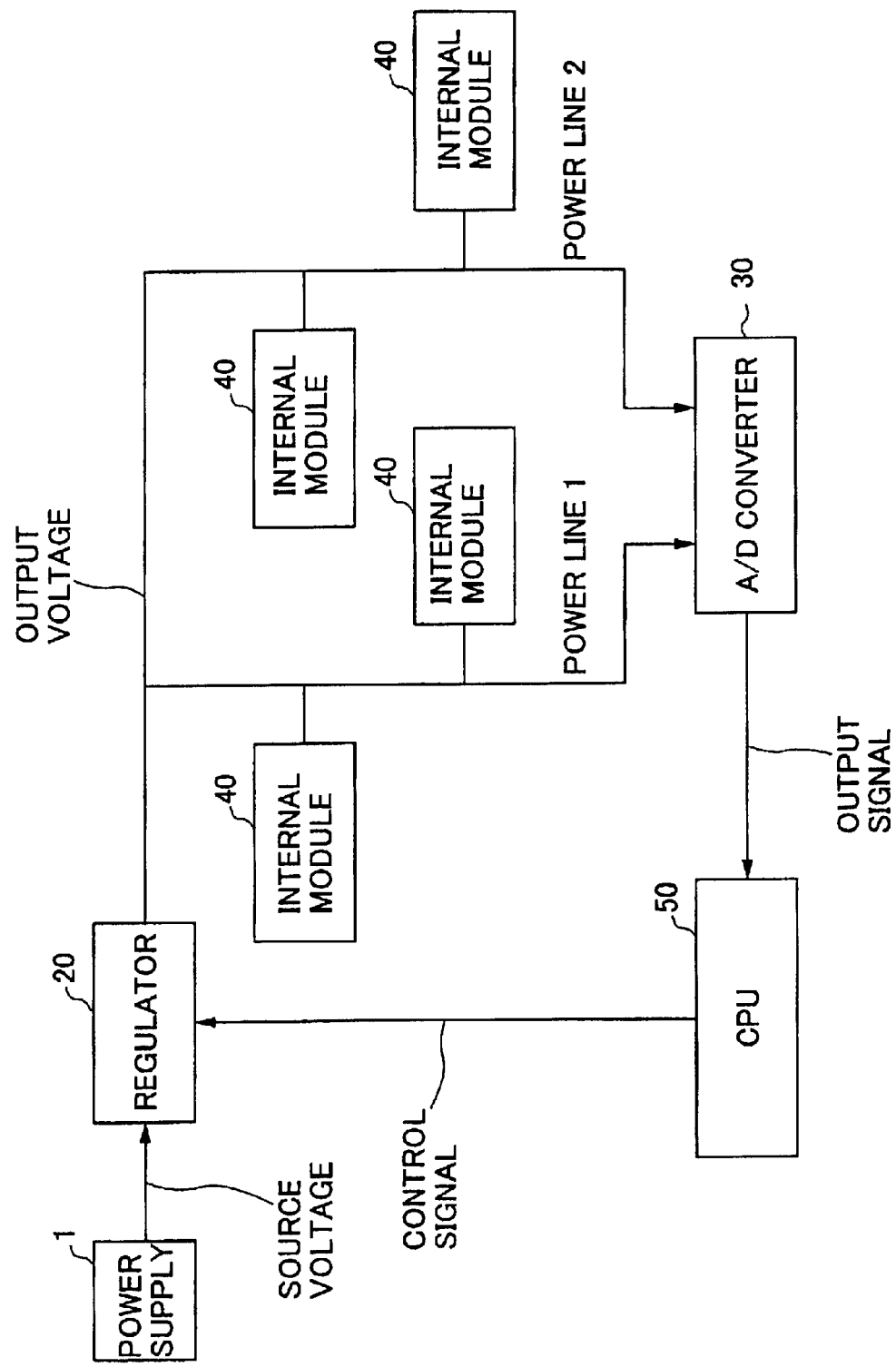
FIG. 6 is a block diagram of the semiconductor device in another preferred embodiment of the present invention.

FIG. 6 shows the semiconductor device in another preferred embodiment of the present invention.

As shown in FIG. 6, in the present embodiment, the voltage monitoring circuit 10 in the previous embodiment of FIG. 1 is constituted by using a CPU (central processing unit) 50 of the semiconductor device. Other elements in the embodiment of FIG. 6 are essentially the same as the corresponding elements in the semiconductor device of the previous embodiment of FIG. 1.

In FIG. 6, the elements which are essentially the same as the corresponding elements in FIG. 1 are designated by the same reference numerals, and a description thereof will be omitted.

In the semiconductor device of FIG. 6, the above-described functions of the voltage monitoring circuit 10 in the previous embodiment of FIG. 1 are realized by using the CPU 50. Specifically, the CPU 50 is provided with a control register. Every time one operation mode is selected from among a number of operational modes, the CPU 50 acts to write a predetermined value for the selected operational mode to the control register.

In the CPU 50, a control signal is generated based on a result of comparison between the value held by the control register and the value indicated by the output signal of the A/D converter 30. The CPU 50 outputs the generated control signal to the regulator 20 so that the regulator 20 supplies the output voltage, which is adjusted to an optimal output voltage for the selected operational mode by the control signal, to the internal modules 40 via the power lines.

Namely, when the value indicated by the output signal of the A/D converter 30 is larger than the value held by the control register, the CPU 50 outputs a control signal that decreases the output voltage of the regulator 20, to the regulator. On the other hand, when the value indicated by the output signal of the A/D converter 30 is smaller than the value held by the control register, the CPU 50 outputs a control signal that increases the output voltage of the regulator 20, to the regulator 20.

Figure 7:
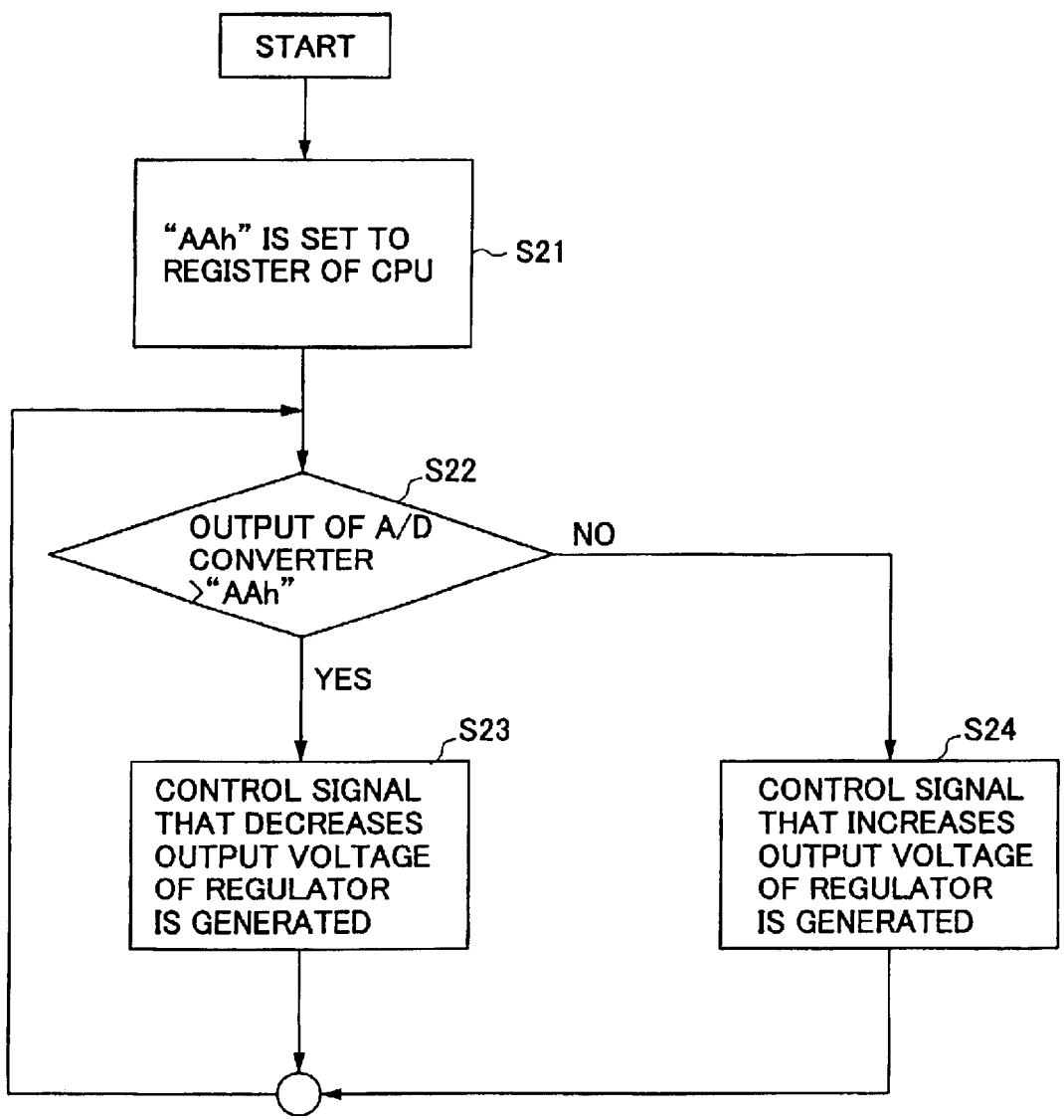
FIG. 7 is a flowchart explaining operation of the semiconductor device of FIG. 6.

FIG. 7 is a flowchart for explaining operation of the semiconductor device shown in the FIG. 6.

The voltage monitoring procedure by the CPU 50 is started whenever one operational mode is selected from the number of operational modes in the semiconductor device.

For the sake of convenience of description, it is assumed that the sleep mode of the semiconductor device is currently selected.

As shown in FIG. 7, at a start of the voltage monitoring procedure, the CPU 50 at step S21 sets a predetermined value "AAh"), corresponding to the selected sleep mode, to the control register of the CPU 50.

The CPU 50 at step S22 determines whether the value indicated by the output signal of the A/D converter 30 is larger than the value ("AAh") held by the control register at step S21.

When it is determined in the step S22 that the value indicated by the output signal of the A/D converter 30 is larger than the value held by the control register, the CPU 50 at step S23 outputs a control signal that decreases the output voltage of the regulator 20, to the regulator 20.

If a predetermined time has elapsed after the step S23, the control of the CPU 50 is returned to the above step S22, and the same procedure is repeated.

On the other hand, when it is determined in the step S22 that the value indicated by the output signal of the A/D converter 30 is not larger than the value held by the control register, the CPU 50 at step S24 outputs a control signal that increases the output voltage of the regulator 20, to the regulator 20.

If a predetermined time has elapsed after the step S24, the control of the CPU 50 is returned to the above step S22, and the same procedure is repeated.

According to the semiconductor device including the CPU 50 of the above-described embodiment, the output voltage of the regulator 20 can be adjusted to an optimal output voltage for a selected operational mode in the semiconductor device. Therefore, for example, when the semiconductor device is operating in the low-power mode, the reduction of the power dissipation is possible, unlike the conventional power supply device.

As described in the foregoing, in the voltage monitoring circuit of the above-described embodiments, an optimal output voltage for a selected one of a number of operational modes can be supplied to the internal module, and it is possible for the semiconductor device including the voltage monitoring circuit of the above-described embodiments to achieve reduction of the power dissipation.

Moreover, in the voltage monitoring circuit of the above-described embodiments, the output voltage of the voltage-decreasing regulator is controllable according to the source voltage taken out from a different location along the power supply wiring, and it is possible to set the output voltage of the regulator to an optimal output voltage for a location where the voltage drop is large. Therefore, it is possible to prevent the narrowing of the range of the operating voltage of the internal module connected to the power supply wiring in which the voltage drop is large, as in the conventional power supply device.

The present invention is not limited to the above-described embodiments, and variations and modifications may be made without departing from the scope of the present invention.

Further, the present invention is based on Japanese priority application No. 2002-079714, filed on Mar. 20, 2002, the entire contents of which are hereby incorporated by reference.

What is claimed is:

1. A semiconductor device in which an operational mode is selected from among a number of operational modes, comprising:
   a voltage-decreasing regulator converting a source voltage into an output voltage in accordance with a control signal, the regulator supplying the output voltage to an internal module of the semiconductor device via a power line;
   an analog-to-digital converter converting the output voltage received from the power line, into an output signal which indicates a value of the received output voltage; and
   a voltage monitoring circuit having a control register that holds a value predetermined for the selected operational mode, and generating the control signal based on a result of comparison between the value indicated by the output signal of the converter and the value held by the control register,
   wherein the voltage monitoring circuit outputs the control signal to the regulator so that the regulator supplies the output voltage, which is adjusted to an optimal output voltage for the selected operational mode by the control signal, to the internal module.

2. The semiconductor device of claim 1 wherein the semiconductor device includes a plurality of voltage monitoring circuits, a plurality of voltage-decreasing regulators, and a plurality of internal modules respectively connected to a plurality of power lines, the plurality of voltage monitoring circuits being separately formed on a plurality of semiconductor chips, and the analog-to-digital converter being formed on a common semiconductor chip provided in common to the plurality of semiconductor chips.

3. The semiconductor device of claim 1 wherein the voltage monitoring circuit comprises a comparator which receives the output signal of the converter and the value held by the control register, and outputs a signal indicating the result of comparison between the value indicated by the output signal of the converter and the value held by the control register.

4. The semiconductor device of claim 2 wherein the common semiconductor chip on which the analog-to-digital converter is formed includes a multiplexer which is connected to the plurality of semiconductor chips.

5. The semiconductor device of claim 1 wherein, when the value indicated by the output signal of the converter is larger than the value held by the control register, the voltage monitoring circuit outputs the control signal, which decreases the output voltage of the regulator, to the regulator, and when the value indicated by the output signal of the converter is smaller than the value held by the control register, the voltage monitoring circuit outputs the control signal, which increases the output voltage of the regulator, to the regulator.

6. The semiconductor device of claim 1 wherein the output signal of the A/D converter is transmitted to the voltage monitoring circuit by using a serial communication.

7. The semiconductor device of claim 1 wherein the voltage monitoring circuit is constituted by using a central processing unit.

8. The semiconductor device of claim 1 wherein the number of operational modes of the semiconductor device comprises a normal operational mode and a low-power mode.

9. The semiconductor device of claim 2 wherein the plurality of internal modules are respectively provided on the plurality of semiconductor chips related to the plurality of voltage monitoring circuits, and each of output voltages of the plurality of voltage-decreasing regulators is supplied to the converter via one of the plurality of power lines.

10. The semiconductor device of claim 1 wherein a plurality of values corresponding to the number of operational modes are predetermined for the semiconductor device, and whenever one operational mode is changed to another among the number of operational modes, a corresponding one of the predetermined values is written to the control register of the voltage monitoring circuit.

11. The semiconductor device of claim 1 wherein the number of operational modes of the semiconductor device comprises a normal operational mode, a sleep mode and a stop mode.

* * * * *

UNITED STATES PATENT AND TRADEMARK OFFICE
CERTIFICATE OF CORRECTION

PATENT NO. : 6,870,778 B2
DATED : March 22, 2005
INVENTOR(S) : Yukihiro Ozawa et al.

It is certified that error appears in the above-identified patent and that said Letters Patent is hereby corrected as shown below:

Title page,
Item [73], Assignee, change "kawasaki" to -- Kawasaki --.

Signed and Sealed this

Fourth Day of October, 2005

JON W. DUDAS
*Director of the United States Patent and Trademark Office*